U. M. LUNDÉN.
MILKING MACHINE.
APPLICATION FILED APR. 21, 1909.
954,530.
Patented Apr. 12, 1910.
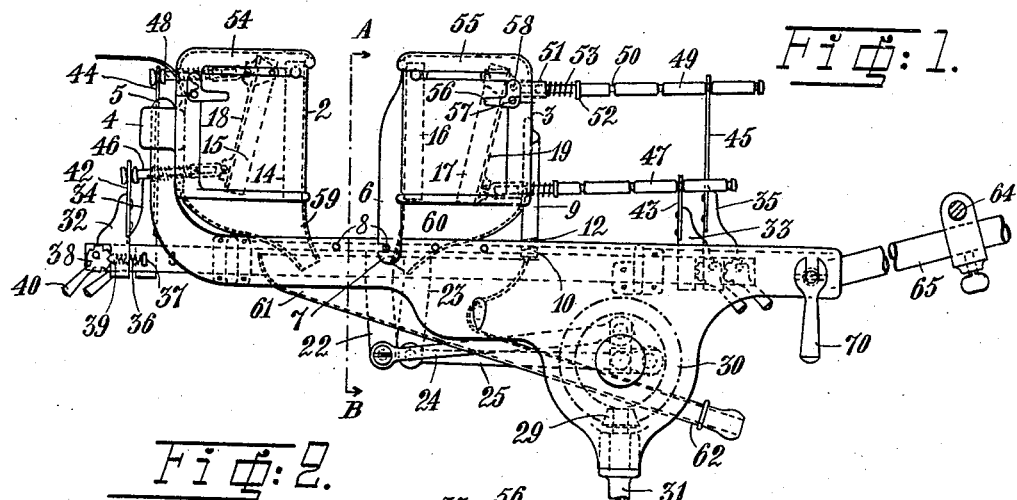
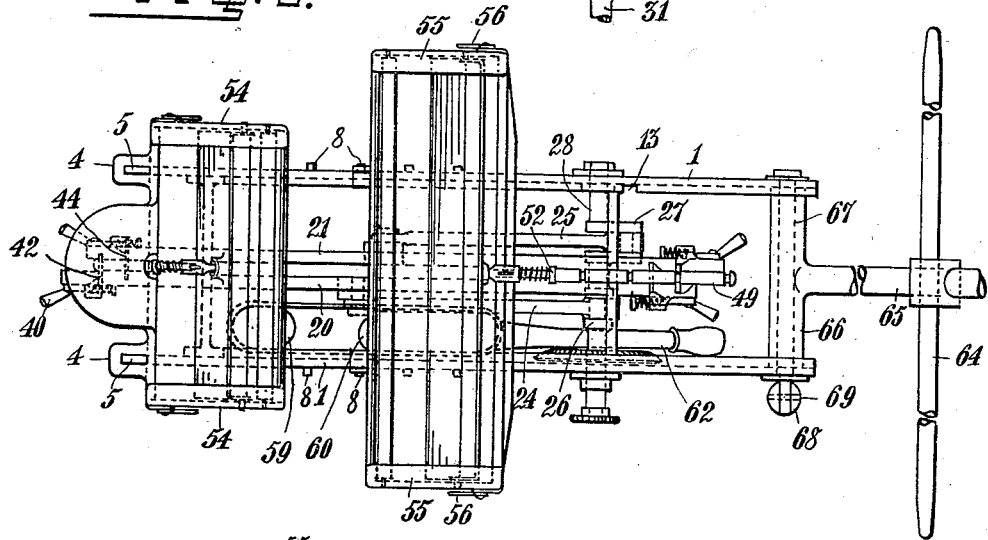
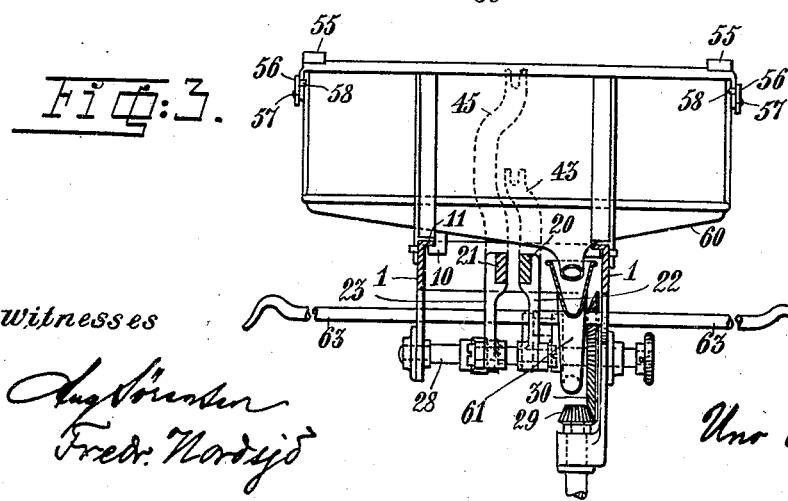
Witnesses
Inventor
Uno M. Lundén

UNITED STATES PATENT OFFICE.

UNO MELCHER LUNDÉN, OF STOCKHOLM, SWEDEN, ASSIGNOR OF ONE-THIRD TO JAMES HAMILTON, OF LYCKÅS, SWEDEN.

MILKING-MACHINE.

954,530.  Specification of Letters Patent.  Patented Apr. 12, 1910.

Application filed April 21, 1909. Serial No. 491,409.

*To all whom it may concern:*

Be it known that I, UNO MELCHER LUNDÉN, a subject of the King of Sweden, residing at Stockholm, in the Kingdom of Sweden, have invented new and useful Improvements in Milking-Machines, of which the following is a specification, reference being had to the drawing accompanying and forming a part hereof.
This invention relates to milking machines and particularly to that class of milking machines in which the teats of the cow are operated by disks or cushions movable relatively to each other in such a manner as to first approach each other with their upper edges so as to cut off the milk in the teats from the udder, then swing with their lower sides toward each other so as to squeeze out the milk in the teats, and, finally, recede from each other, first with their upper and then with their lower sides, into a position in which the teats are allowed to be again filled with milk, before the operation hereinbefore set forth is repeated.
The object of the invention is to provide a machine of the said kind which is simple in construction and handling, and in which the upper part of the machine, or the part thereof adjacent to the udder, is as free as possible from moving parts other than the disks or cushions operating the teats.

The invention consists, chiefly, in the combination with the teat cups, and the clamping devices movable therein, of longitudinally movable bars mounted below the said teat cups, means for reciprocating the said bars, and means for transmitting motion from the reciprocating bars to the said clamping devices.
The means for reciprocating the bars may consist of a revoluble crank-shaft and connecting rods pivotally connected to the bars, or to parts attached thereto. Also eccentrics and eccentric rods may be used. For transmitting motion from the bars to the clamping devices I preferably employ upwardly projecting arms attached to the reciprocating bars, and rods connected to the clamping devices and to the said bars. Preferably, the upwardly projecting arms, or the rods connected thereto, or both, may be springy so as to form a yielding connection between the reciprocating bars and the clamping devices.
The teat cups may, suitably, be adjustable in positions relatively to each other so that the apparatus may be adjusted for different cows. The pressure on the teats exerted by the clamping devices may be finely adjusted by a corresponding adjustment of the upwardly projecting arms along the reciprocating bars.

In order that the apparatus may be easily taken to pieces for cleansing or repair, the disks or cushions forming the clamping devices are suitably retained at the top by clasps which may be folded upward so as to allow the clamping devices being removed, when desired.

The invention further comprises the construction and combination of parts hereinafter more particularly described.

In the drawing, I have shown, by way of example, a milking machine embodying the invention.

Figure 1 is a side-elevation of the said machine, Fig. 2 is a plan-view thereof, and Fig. 3 is a cross-sectional view on line A—B of Fig. 1, viewed in the direction of the arrows.

Referring to the drawing, 1 is a frame adapted to be placed under the udder of the cow in such a manner that one teat cup 2 is just below the two rear teats and the other teat cup 3, which is, suitably, somewhat broader than the former one, is just below the fore teats of the cow. In the embodiment shown in the drawing, the rear teat cup 2 is provided with eyes 4 adapted to be placed on standards 5 projecting upwardly from the frame 1. The fore teat cup 3 is provided with downwardly projecting arms 6 the lower ends of which are formed as hooks 7 adapted to be engaged by lugs or pins 8 projecting laterally from the longitudinal side-pieces of the frame 1 (see Figs. 1 and 2). In order to reliably secure the fore teat cup 3 in position, said teat cup is provided, at its fore side, with downwardly projecting arms 9 having at their lower ends laterally projecting hooks 10 gripping under flanges 11 (Fig. 3) projecting inwardly from the upper sides of the side-pieces of the frame 1. As shown in Fig. 1, the slot 12 in each of the arms 9 by which the hook 10 is formed has an oblique direction so as to form an angle with the longitudinal direction of the apparatus, said oblique direction of the slot 12 allowing the teat cup 3, after having been slid a short distance to the right of Fig. 1 for disengaging the hooks 7 from the pins 8, to be turned a small angle in the clockward direction. By such a movement of the teat cup the arms 6 are lifted with their lower ends above the rows of pins 8 so that the teat cup may be freely slid in either direction and adjusted in another position in which the hooks 7 are engaged by another pair of pins 8. If it is desired to detach the teat cup 3 from the frame 1, the teat cup 3 is slid, after the arms 6 have been disengaged from the pins 8, into a position in which the hook 10 of each arm 9 is just below a slot 13 in the corresponding flange 11, after which the teat cup may be easily removed. The reinsertion of the teat cup is performed in analogous manner.

Placed in each teat cup is a clamping device consisting in the embodiment illustrated of two disks 14, 15 and 16, 17, respectively, said disks being suitably formed by elastic material, such as india rubber. One disk of each teat cup, preferably those adjacent to each other, thus for instance the disks 14 and 16, may be stationary, while the two other disks 15 and 17 are movable in the manner hereinafter described but, obviously, both disks of each teat cup may be movable, if desired. The movable disks or clamping devices 15, 17 are suitably mounted on plates 18, 19 of metal or other suitable material forming bearings for the connections between the driving means and the said clamping devices.

Slidably mounted in cross-pieces of the frame 1 are two bars 20, 21 which may be reciprocated in any suitable manner. In the embodiment shown in the drawing the bars 20, 21 are provided with downwardly projecting arms 22, 23 having their lower ends connected by connecting rods 24, 25, respectively, with the cranks 26, 27 of a rotary crank-shaft 28. The latter may be rotated in any suitable manner, for instance by bevel gear 29, 30 from a rotary driving shaft 31. As shown in Fig. 2, the cranks 26, 27 are suitably set at an angle to each other of a quarter of a circle for reasons hereinafter explained.

Projecting upwardly from the ends of the bars 20, 21 are arms 32, 33, 34, 35 which are, suitably, adjustable along the said bars. In the embodiment shown each arm forms an eye of the shape of the cross-section of the bar, said eye being placed around the bar so that the arm is able to slide along the said bar. As shown at the left hand side of Fig. 1, the arm 32 is actuated by a spiral spring 36 entering at one end into a socket in the inner side of the arm and placed between the bottom of the said socket and a shoulder 37 projecting laterally from the bar 20. The spring 36 tends to move the arm 32 rearward into contact with an eccentric disk 38 having at its periphery a series of notches adapted to receive a corresponding lug 39 from the sliding arm 32. The disk 38 may be turned by a handle 40 so that the lug 39 may be brought into engagement with different notches in the disk 38 by which a fine adjustment of the arm 32 on the bar 20 is made possible. The adjusting devices for the other arms are shown similarly arranged.

Preferably, each arm 32, 33, 34, 35 carries an upwardly extending blade spring 42, 43, 44, 45, respectively, the upper end of each of said springs being suitably forked, as shown in Fig. 3, so as to be able to engage a recessed part of a rod 46, 47, 48, 49, respectively. The inner ends of the said rods 46, 47, 48, 49 are pivotally connected to the movable clamping device of the corresponding teat cup, preferably by a ball and socket joint placed at the back 18, or 19 respectively, of the movable disk. Each of the rods 47 and 49 connected to the clamping device of the fore teat cup 3 is shown provided with a series of annular recesses 50 corresponding to the different positions of the said teat cup in relation to the other.

Instead of making the sliding arms springy the rods 46, 47, 48, 49 may be made in parts yieldingly connected together. If desired, both means may be employed. In the drawing, the rods are shown constructed in two parts one of which is slidingly inserted in the other, hollow part and provided with a pin 51 or the like entering an oblong slot in the other part. Inserted between the end of the hollow part and a flange 52 at the other part is a spiral spring 53 tending to keep the two parts in a position in which the pin 51 bears on the end of the slot adjacent to the spring.

The teat-operating disks 14, 15, 16, 17 may be kept in position in the teat cups by clasps 54, 55 hinged to the inner sides of the teat cups at or near the side walls thereof. The clasps may be locked by angle levers 56 adapted to turn on a pivot 57 at the side wall of the teat cup and having a pin 58 entering a recess in a downwardly projecting part of the clasp.

The teat cups are extended downwardly by funnel-shaped bottoms 59, 60 opening into a common collecting channel 61 the lower part of which forms a pipe 62 for leading off the milk.

The machine is hung under the udder of the cow by means of a cross-bar 64 attached to the frame 1, said bar having hooked ends adapted to be supported in eyes at the ends of a strap passing over the back of the cow. The fore end of the machine may be supported in similar manner, for instance by means of a cross-bar 64 attached to a forwardly projecting rod 65. Preferably, the rod 65 is carried by a sleeve 66 loosely mounted about an axle 67 in the frame and adapted to be clamped in desired position therein by means of an eccentric 68 turning on a pin 69 by means of a handle 70.

When the crank-shaft 28 is rotated from the driving shaft 31 the bars 20, 21 are reciprocated and by means of the arms 32, 33, 34, 35 and the rods 42, 43, 44, 45 cause the clamping devices 15 and 17 to swing in such a manner as to consecutively cut off the milk in the teats from the udder, pressing out the milk within the teats, and allowing the latter to again fill themselves with milk from the udder. In order to accurately regulate the pressure on the teats, the arms 32, 33, 34, 35 may be adjusted on the bars 20, 21 by means of the eccentric disks 38 etc.

On account of the cranks 26, 27 being set at an angle to each other of a quarter of a circle, the clamping devices will move in such a manner that, when the clamping device of one teat cup compresses the teats, the clamping device of the other teat cup releases the teats, and vice versa. By this means the teats are operated alternately which is generally considered to be advantageous.

Though I have hereinbefore supposed the apparatus to be provided with teat cups extending transversely of the cow, it is obvious that it may as well be constructed with teat cups placed at the side of each other so that the two left teats will be operated by the one and the two right teats by the other teat cup.

I claim:

1. In a milking machine, the combination of teat cups, clamping devices movable in the said teat cups, reciprocating bars placed below the said teat cups in such positions as to be partly covered by the same when viewed from above, a driving device for the reciprocating bars placed below the said bars, arms extending upwardly from the said bars, and connections between the said bars and the clamping devices for imparting a swinging motion to the same, substantially as and for the purpose set forth.

2. In a milking machine, the combination of teat cups adjustable relatively to each other, clamping devices movable in the said teat cups, reciprocating bars placed below the said teat cups in such positions as to be partly covered by the same when viewed from above, a driving device for the reciprocating bars placed below the said bars, arms extending upwardly from the said bars, and adjustable connections between the said bars and clamping devices for imparting a swinging motion to the same, substantially as and for the purpose set forth.

3. In a milking machine, the combination of teat cups, clamping devices movable in the said teat cups, longitudinally movable bars mounted below the teat cups, means for reciprocating the said bars, forked arms projecting upwardly from the said bars, and rods connected to the clamping devices and having recessed parts adapted to be placed in the said forked arms, substantially as and for the purpose set forth.

4. In a milking machine, the combination of teat cups, clamping devices movable in the said teat cups, longitudinally movable bars mounted below the teat cups, means for reciprocating the said bars, forked arms projecting upwardly from the said bars, and compressible rods connected to the clamping devices and having recessed parts adapted to be placed in the said forked arms, substantially as and for the purpose set forth.

5. In a milking machine, the combination of teat cups, clamping devices movable in the said teat cups, longitudinally movable bars mounted below the teat cups, means for reciprocating the said bars, yielding arms having forked ends projecting upwardly from the said bars, and compressible rods connected to the clamping devices and having recessed parts adapted to be placed in the said forked arms, substantially as and for the purpose set forth.

6. In a milking machine, the combination of teat cups, clamping devices movable in the said teat cups, longitudinally movable bars mounted below the teat cups, means for reciprocating the said bars, arms projecting upwardly from the said bars, forked springs carried by the said bars, and compressible rods connected to the clamping devices and having recessed parts adapted to be placed in the forked springs, substantially as and for the purpose set forth.

7. In a milking machine, the combination of teat cups, clamping devices movable in the said teat cups, longitudinally movable bars mounted below the teat cups, means for reciprocating the said bars, upwardly projecting arms adjustably supported by the said bars, and compressible rods transmitting motion from the said arms to the clamping devices, substantially as and for the purpose set forth.

8. In a milking machine, the combination of teat cups, clamping devices movable in the said teat cups, longitudinally movable bars mounted below the teat cups, means for reciprocating the said bars, upwardly projecting arms slidably mounted on the said bars, eccentric disks for adjusting said arms along the bars, springs acting to keep the said arms in contact with the said eccentric disks, and compressible rods transmitting motion from the said arms to the clamping devices, substantially as and for the purpose set forth.

9. In a milking machine, the combination of a frame, teat cups carried by the said frame at an adjustable distance from each other, clamping devices movable in the said teat cups, longitudinally movable bars mounted below the said teat cups, means for reciprocating the said bars, and means for transmitting motion from the reciprocating bars to the clamping devices, substantially as and for the purpose set forth.

10. In a milking machine, the combination of a frame, a teat cup placed in the said frame, a second teat cup movable in guides in the said frame and having arms adapted to engage either pair of two series of pins projecting from the frame, clamping devices movable in the teat cups, longitudinally movable bars mounted below the said teat cups, means for reciprocating the said bars, and means for transmitting motion from the reciprocating bars to the clamping devices, substantially as and for the purpose set forth.

11. In a milking machine, the combination of teat cups, clamping devices movable in the said teat cups, clasps hinged to the said teat cups and adapted to be secured in folded down positions for retaining and guiding the clamping devices, longitudinally movable bars mounted below the teat cups, means for reciprocating the said bars, and means for transmitting motion from the reciprocating bars to the clamping devices, substantially as and for the purpose set forth.

12. In a milking machine, the combination of teat cups, clamping devices movable in the said teat cups, longitudinally movable bars mounted below the teat cups, a rotary shaft having two cranks set at an angle to each other of a quarter of a circle, connecting rods transmitting motion from the said cranks to the longitudinally movable bars, and means for transmitting motion from the reciprocating bars to the clamping devices, substantially as and for the purpose set forth.

13. In a milking machine, the combination of teat cups, a pair of movable disks placed in each of the said teat cups, longitudinally movable bars mounted below the teat cups, means for reciprocating the said bars, and means for transmitting motion from the reciprocating bars to both disks of each teat cup, substantially as and for the purpose set forth.

UNO MELCHER LUNDÉN.

Witnesses:
 AUG. SÖRENSEN,
 KONR. DAHLGRIST.